Patented Jan. 3, 1933

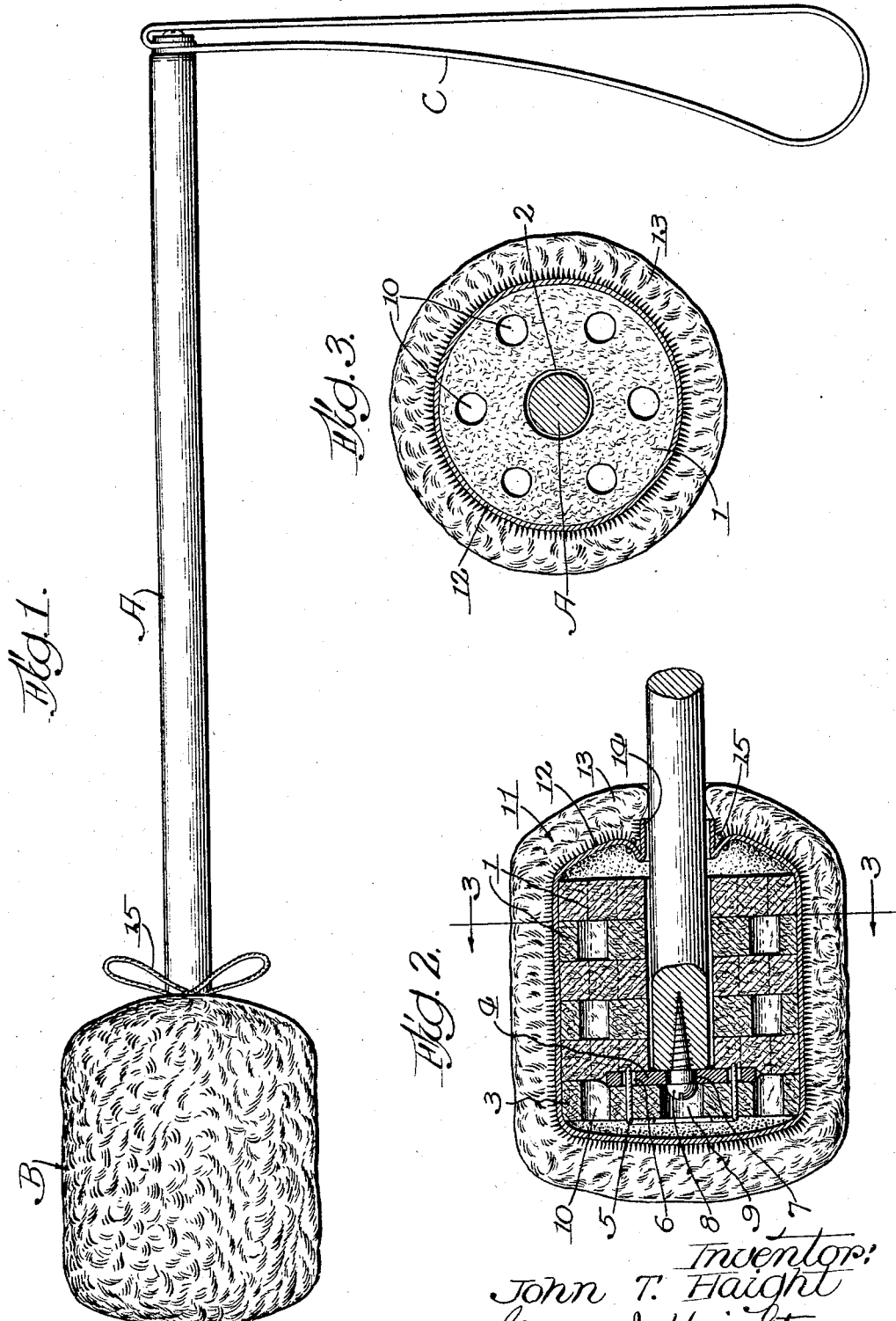
Jan. 3, 1933. J. T. HAIGHT 1,892,886
DRUMSTICK FOR BASS DRUMS
Filed Oct. 7, 1930
Inventor:
John T. Haight
BY: George I. Haight, Atty.

1,892,886

UNITED STATES PATENT OFFICE

JOHN T. HAIGHT, OF ROCKFORD, ILLINOIS

DRUMSTICK FOR BASS DRUMS

Application filed October 7, 1930. Serial No. 486,990.

My invention relates to improvements in drumstick, adapted more particularly for use in connection with bass drums.

The principal object of the invention is to provide a drumstick which, by reason of its construction and operation, will improve the tone qualities of the drum with which it is used; which will minimize wear on the drumhead and eliminate the swishing or scuffing noise incident to its contact with the drumhead surface; which will be light in weight and effective to handle; and which will be inexpensive to manufacture and repair.

Other objects of my invention will appear hereinafter.

Referring to the accompanying drawing,

Fig. 1 is a view in elevation of a drumstick embodying my invention;

Fig. 2 is an enlarged longitudinal central section of the drumstick head of Fig. 1; and Fig. 3 is a transverse section on line 3—3 of Fig. 2.

The drumstick shown in the drawing, and which exemplifies my invention, comprises in general a handle or stick member A, and a beater head B rotatably mounted at one end thereof. The handle member A may be of any suitable shape in cross-section and of any desired length for the purpose. That which is shown in the drawing is round in cross-section and preferably made of light, strong wood, having some degree of flexibility so as to render the device more effective in operation. At the end opposite the head, the flexible strap C is anchored. This strap is formed into a loop such as customarily used on the ends of drumsticks of this character for embracing the operator's wrist to prevent the device from slipping from his hand.

The body of the beater head is made up of a plurality of flat circular discs 1, superposed one upon the other and mounted upon the end portion of the handle A, as shown clearly in Fig. 2. These discs have central openings 2, through which the stick or handle A extends, the holes being sufficiently large to provide some clearance and permit the discs to rotate freely on the handle. The outer end disc 3 is fastened to a smaller and thinner disc 4 in any suitable manner, such as by means of the stitching 5 which extends through the disc 3 and through holes 6 in the disc 4. The disc 4 is preferably made of hard fibre or metal, and has a central opening 7 which serves as a bearing upon the screw 8 threaded into the end of the handle, the opening 7 in the bearing disc 4 being sufficiently large to permit the free rotation in the disc 4 on the screw. The end disc 3 has a central opening 9 for the accommodation of the head of the screw 8.

The bearing disc 4 is considerably smaller in diameter than the body discs of the head and is preferably positioned between the first and second body discs 3 and 1. This provides sufficient padding around the discs so that it cannot injure the head of the drum. The body discs, including the disc 3, can preferably be made of any suitable material for the purpose. I prefer to make them of felt of such a degree of firmness that the beater head will produce the proper tone quality in the drum. If desired, the discs may each be provided with a series of holes 10 near their peripheries, for the purpose of rendering the head springy in its action and also to lessen the weight of the beater head.

The felt body discs are enclosed in a tubular bag or casing 11 of any suitable material. I have found that sheepskin is the most satisfactory for the purpose, because the skin 12 itself forms a suitable bag or casing of sufficient strength and flexibility, and the wool 13 forms an effective layer of padding on the exterior of the beater head to contact with the drumhead without wear or damage to the drumhead. The casing is preferably closed at its outer end, and its inner end 14 is open so that the bag or casing may be slipped over the group of body discs. After the group of body discs have been inserted into the casing, the open end thereof is contracted by means of a drawstring 15 to completely enclose the body of the beater head. The open end is contracted by the drawstring sufficiently to completely enclose the body, but not tightly enough to grip the handle and interfere with the rotary action of the head. The casing is of such size that when the end thereof is contracted by the drawstring, it forces and holds the group of body discs into compact assembled relation.

I have found that a structure of this character provides a beater head which is light in weight and is sufficiently firm or solid to produce the proper tone quality when impacted against the head of the drum, and at the same time it is sufficiently soft and flexible to eliminate wear or other damage to the drumhead. There are two principal advantages in having the entire head freely rotatable on the handle. One of these advantages is that by reason of the rolling contact, frictional wear in both the beater head and drumhead are eliminated, and the swishing or scuffing noise on the drumhead surface is also eliminated. The other advantage is that the rolling contact, instead of a frictional contact with the drumhead, causes the proper vibrations in the drumhead to produce an improved tone quality.

While I have herein shown and described what I consider the preferred manner of carrying out my invention, the same is merely illustrative and I contemplate all changes and modifications that come within the scope of the appended claims.

I claim:

1. In a drumstick of the character described, the combination of a handle member, and a beater head rotatably mounted on said handle member for rotation upon striking a drum head.

2. In a drumstick of the character described, the combination of a handle member, and a beater head freely rotatable on said handle member on the longitudinal axis thereof, in response to an impact with the drum head.

3. In a drumstick of the class described, the combination of a handle member, and a beater head comprising a plurality of yieldable discs assembled on said handle, and means supporting said head for rotation on said handle.

4. In a drumstick of the class described, the combination of a handle member, a beater head comprising a plurality of yieldable discs assembled on said handle, means supporting said head for rotation on said handle, and a flexible casing enclosing said head.

5. In a drumstick of the character described, the combination of a suitable handle member, a beater head rotatably supported on said handle for rotation upon striking a drum head and comprising a body member of yielding material, and a flexible covering enclosing said body member.

6. In a drumstick of the character described, the combination of a suitable handle member, a beater head rotatably supported on said handle and comprising a body member of yielding material, and a flexible covering enclosing said body member, said covering being in the form of a bag open at one end and having a drawstring for contracting the opening to enclose the body member within the bag.

7. In a drumstick of the character described, the combination of a suitable handle member, a beater head rotatably supported on said handle and comprising a body member of yielding material, and a flexible covering enclosing said body member, said covering being in the form of a bag open at one end, having a drawstring for contracting the opening to enclose the body member within the bag, and having padding material on its exterior.

8. In a drumstick of the class described, the combination of a beater head comprising a yieldable body having a central opening, a handle member inserted in said central opening, and means rotatably securing the body member to said handle member.

9. In a drumstick of the class described, the combination of a beater head comprising a yieldable body having a central opening, a handle member inserted in said central opening, and means rotatably securing the body member to said handle member adjacent the outer end of the body member.

10. In a drumstick of the class described, the combination of a handle member, a bearing member rotatably mounted at the outer end of said handle, a disc of yieldable material secured to said bearing member, a plurality of discs of yieldable material rotatable on said handle member, and a flexible covering enclosing said yieldable discs and holding the same in an assembled group in engagement with the yieldable disc secured to the bearing member.

11. In a drumstick of the class described, the combination of a handle member, a plurality of yieldable felt discs assembled in a group and rotatable on said handle member, a bearing member rotatably mounted on said handle member and secured to the felt disc at one end of the group, and a sheepskin bag enclosing said group of discs to hold them in assembled relation.

In witness that I claim the foregoing I have hereunto subscribed my name this 3rd day of Oct., 1930.

JOHN T. HAIGHT.